US011519546B2

(12) United States Patent
Louise-Alexandrine Baron et al.

(10) Patent No.: US 11,519,546 B2
(45) Date of Patent: Dec. 6, 2022

(54) FLUID PIPE INSPECTION DEVICE HAVING NON-MOTORIZED DISPLACEMENT (71) Applicant: SUEZ GROUPE, Paris (FR)

(72) Inventors: Emmanuelle Louise-Alexandrine Baron, Paris (FR); Etienne Damerose, Carrieres sur Seine (FR); Aude Garda, Bordeaux (FR); Guillaume Binet, Martignas-sur-Jalle (FR); Benoit Collignon, Pontault-Combault (FR)

(73) Assignee: SUEZ GROUPE, Paris La Défense (FR)

( * ) Notice: Subject to any disclaimer, the term of this patent is extended or adjusted under 35 U.S.C. 154(b) by 426 days.

(21) Appl. No.: 16/753,746

(22) PCT Filed: Sep. 28, 2018

(86) PCT No.: PCT/EP2018/076409
§ 371 (c)(1),
(2) Date: Apr. 3, 2020

(87) PCT Pub. No.: WO2019/081156
PCT Pub. Date: May 2, 2019

(65) Prior Publication Data
US 2020/0256501 A1 Aug. 13, 2020

(30) Foreign Application Priority Data
Oct. 24, 2017 (FR) ...................................... 1760058

(51) Int. Cl.
*F16L 55/30* (2006.01)
*F16L 55/48* (2006.01)
*E03F 7/12* (2006.01)
*F16L 101/30* (2006.01)
*G01M 3/00* (2006.01)
*G01M 3/38* (2006.01)

(52) U.S. Cl.
CPC ................ *F16L 55/30* (2013.01); *E03F 7/12* (2013.01); *F16L 55/48* (2013.01); *F16L 2101/30* (2013.01); *G01M 3/005* (2013.01); *G01M 3/38* (2013.01)

(58) Field of Classification Search
CPC . F16L 55/26–38; F16L 55/48; F16L 2101/30; E03F 7/12; G01M 3/00; G01M 3/005; G01M 3/24; G01M 3/38
See application file for complete search history.

(56) References Cited

U.S. PATENT DOCUMENTS 3,460,028 A * 8/1969 Beaver ............... G01N 27/9073
346/33 P
4,868,648 A 9/1989 Nobunaga
(Continued)

FOREIGN PATENT DOCUMENTS

DE 94 00 628 U1 8/1994
DE 10 2009 057284 A1 6/2011
(Continued)

*Primary Examiner* — Nguyen Q. Ha
(74) *Attorney, Agent, or Firm* — BakerHostetler (57) ABSTRACT A non-motorized inspection device for inspecting a fluid pipeline, includes a monitoring device capable of generating at least one representation of the pipeline, an inertial unit capable of determining orientation data relating to the inspection device, and a means for preventing distortion of the at least one representation.

9 Claims, 5 Drawing Sheets (56) References Cited

U.S. PATENT DOCUMENTS

| | | | |
|---|---|---|---|
| 2008/0173109 A1 | 7/2008 | Cogen et al. | |
| 2014/0013872 A1* | 1/2014 | Thursby | F16L 55/28 73/865.8 |
| 2016/0282121 A1* | 9/2016 | Kim | G01C 21/20 |

FOREIGN PATENT DOCUMENTS

| | | | | |
|---|---|---|---|---|
| DE | 20 2014 007542 U1 | | 1/2016 | |
| GB | 2102565 A | * | 2/1983 | F16L 55/26 |
| GB | 2 226 633 A | | 7/1990 | |
| GB | 2410070 A | * | 7/2005 | F16L 55/28 |
| WO | 2013/138102 A2 | | 9/2013 | |

* cited by examiner

FLUID PIPE INSPECTION DEVICE HAVING NON-MOTORIZED DISPLACEMENT

CROSS-REFERENCE TO RELATED APPLICATIONS

This application is a National Stage of International patent application PCT/EP2018/076409, filed on Sep. 28, 2018, which claims priority to foreign French patent application No. FR 1760058, filed on Oct. 24, 2017, the disclosures of which are incorporated by reference in their entirety.

FIELD OF THE INVENTION

The invention falls within the field of sanitation and the inspection of fluid pipelines, notably of waste water, and relates to a non-motorized inspection device. The invention applies to any type of pipeline fully loaded (with water).

Water pipelines (traps, marine outfalls, etc.) need to be inspected regularly because these works are exposed to various risks such as silting up, structural degradation, infiltrations or exfiltrations, or even, in the worst cases, subsidences giving rise to pollutions. It is therefore essential to ensure that they are in a good state of operation because they have a key functional role in sanitation networks. A malfunction of these works can have major consequences such as, for example, the overflowing or the discharging of waste water into the natural environment.

Some pipelines may not be able to be inspected, that is to say that their diameter is less than 1600 mm. Furthermore, it is not uncommon for the water pipelines (traps, outfalls) to include bends. Consequently, the dimensions of the inspection equipment must be adapted to the dimensions of the works to be inspected, taking into account the fact that the work is potentially clogged. Furthermore, in pipelines that are completely submerged in water, the inspection is even more difficult. In these works, the distance between two access points can be great. Video images are rarely sharp and usable in waste water.

There are motorized sounding machines but some waste (wet wipes, floating particles, yarns) present in the effluent of the pipeline prevents a motorized sounding machine from moving around, notably because this type of waste can jam in the propellers of the motorized sounding machine.

Moreover, setting a non-motorized sounding machine in motion is restricted because a means for advancing the sounding machine in the pipeline must be found to suit the configuration of the network. It is in fact simpler in operating terms to use a motorized sounding machine despite the abovementioned risks.

The invention aims to overcome all or some of the problems cited above by proposing a non-motorized sounding machine that can move around in any type of pipeline, even one of small diameter (400 mm to 1600 mm), and that has the capacity to detect structural distortions or deteriorations of the pipeline and to assess the possible fouling thereof. The proposed invention makes it possible on the one hand to generate representations of the pipeline (sonar data and/or visual data) and on the other hand to determine the points of the pipeline where the representations have been generated in order to be able to process and analyze the data collected.

To this end, the subject of the invention is a non-motorized inspection device for inspecting a fluid pipeline, comprising a monitoring device capable of generating at least one representation of the pipeline, an inertial unit capable of determining orientation data relating to the inspection device, a means for preventing distortion of the at least one representation. The inspection device can thus move around in a waste water pipeline and ensure that a distortion-free representation of the pipeline is obtained.

The monitoring device can be a sonar and/or one or more cameras. In the case where the monitoring device is a sonar, a representation of the pipeline is a sound image. In the case where the monitoring device is a camera, a representation of the pipeline is a visual datum (image or video).

According to one embodiment, the inspection device comprises a first storage means capable of storing the at least one representation and the data from the inertial unit. This embodiment requires neither cable nor wireless network to transmit the data collected. It thus represents a solution that is economical, robust and powerful.

Advantageously, the inspection device comprises an odometer capable of determining the distance traveled by the inspection device. It is thus possible to associate each representation with a well-defined place in the pipeline.

Advantageously, the inspection device comprises a braking device for the inspection device capable of immobilizing the inspection device at at least one predefined distance interval for a time at least equal to the time of generation of the at least one representation. That makes it possible to keep the inspection device immobile at desired points for the time it takes to generate a complete representation.

Advantageously, the inspection device comprises a pipeline lighting means. The lighting means plays a light-emitting role ensuring better quality representations in the dark pipeline.

Advantageously, the inspection device comprises a locating means. The locating means acts as a light reflector making it possible to locate the inspection device.

According to one embodiment, the inspection device is intended to extend locally along a first axis that is substantially at right angles to a section of the pipeline and comprises a housing encapsulating the inertial unit and supporting the monitoring device, and the means for preventing distortion of the at least one representation comprises at least two sets of at least three guide strips distributed around the housing, each of the at least three guide strips extending radially with respect to the first axis from the housing. These sets of guide strips make it possible to stabilize the inspection device in the pipeline, and, depending on the length of the guide strips, at a certain distance from the edges of the pipeline.

Advantageously, the at least three guide strips of each of the at least two sets are uniformly distributed around the housing. The result thereof is an optimal positioning of the inspection device parallel to the axis of the pipeline. That makes it possible to obtain a distortion-free representation.

Advantageously, the at least three guide strips of each of the at least two sets are flexible. The flexibility of the guide strips makes it possible both to keep the inspection device at a certain distance from the edges of the pipeline, advantageously at the center of the pipeline, and to not block the inspection device in its movement in the pipeline in case of partial obstruction or of reduction of the diameter thereof. The flexibility of the guide strips also allows for any waste not to remain attached to the guide strips, in fact it slides along the guide strips.

According to another embodiment, the means for preventing distortion of the at least one representation comprises a comparator comparing the data from the inertial unit with predefined pipeline data so as to process the at least one representation. That makes it possible to determine whether the inspection device is parallel to the axis of the pipeline and, if necessary, to reprocess the distorted representation obtained to form an undistorted representation.

The invention will be better understood and other advantages will become apparent on reading the detailed description of an embodiment given by way of example, the description being illustrated by the attached drawing in which.

In the interests of clarity, the same elements will bear the same references in the different figures.

Figure 1:
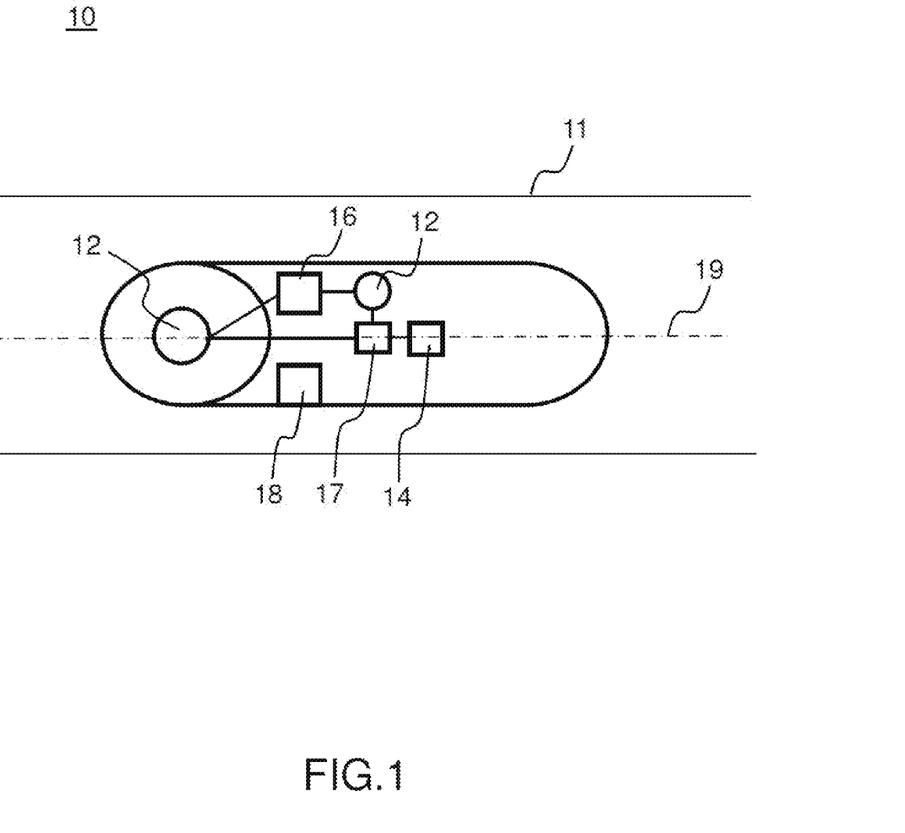
FIG. 1 schematically represents an embodiment of a non-motorized inspection device for inspecting a fluid pipeline according to the invention, FIG. 2 schematically represents an isometric view of another embodiment of a non-motorized inspection device for inspecting a fluid pipeline according to the invention, FIG. 3 schematically represents an isometric view of another embodiment of a non-motorized inspection device for inspecting a fluid pipeline according to the invention, FIG. 4 schematically represents another embodiment of a non-motorized inspection device for inspecting a fluid pipeline according to the invention.

FIG. 1 schematically represents an embodiment of a non-motorized inspection device 10 for inspecting a fluid pipeline 11 according to the invention. The inspection device 10 can move around in the pipeline 11 using the flow rate of the fluid in the pipeline 11. The non-motorized inspection device 10 for inspecting the fluid pipeline 11 comprises a monitoring device 12 capable of generating at least one representation 13 of the pipeline, an inertial unit 14 capable of determining orientation data 15 relating to the inspection device, and a means 18 for preventing distortion of the at least one representation 13.

As represented in FIG. 1, the inspection device 10 can comprise a means 16 for activating/deactivating the monitoring device 12. Nevertheless, this activation/deactivation means 16 is optional, and it is perfectly possible to leave the monitoring device 12 permanently activated.

The monitoring device 12 can be a sonar 21 or a camera 22, or even a set comprising a sonar 21 and one or more cameras 22. The sonar 21 allows for an analysis of the structure of the pipeline 11.

In the embodiment represented in FIG. 1, the inspection device 10 comprises a first storage means 17 capable of storing the at least one representation 13 and the data from the inertial unit 14. The first storage means 17 can for example be an SD card or any other storage medium. The inspection device 10 also comprises a battery (not represented) to power the components of the inspection device 10: monitoring device and inertial unit. The inspection device 10 can comprise an onboard computer ensuring the switching on of the monitoring device, the recording of the representations and the switching off of the monitoring device. The presence of a first storage means 17 embedded in the inspection device 10 represents a solution that is economical (since the data are not transmitted in real time), robust and powerful compared to the solutions of the prior art that require cables to transmit the representations or possibly a wireless network, which is difficult to implement underwater in a buried work, and unreliable.

Figure 2:
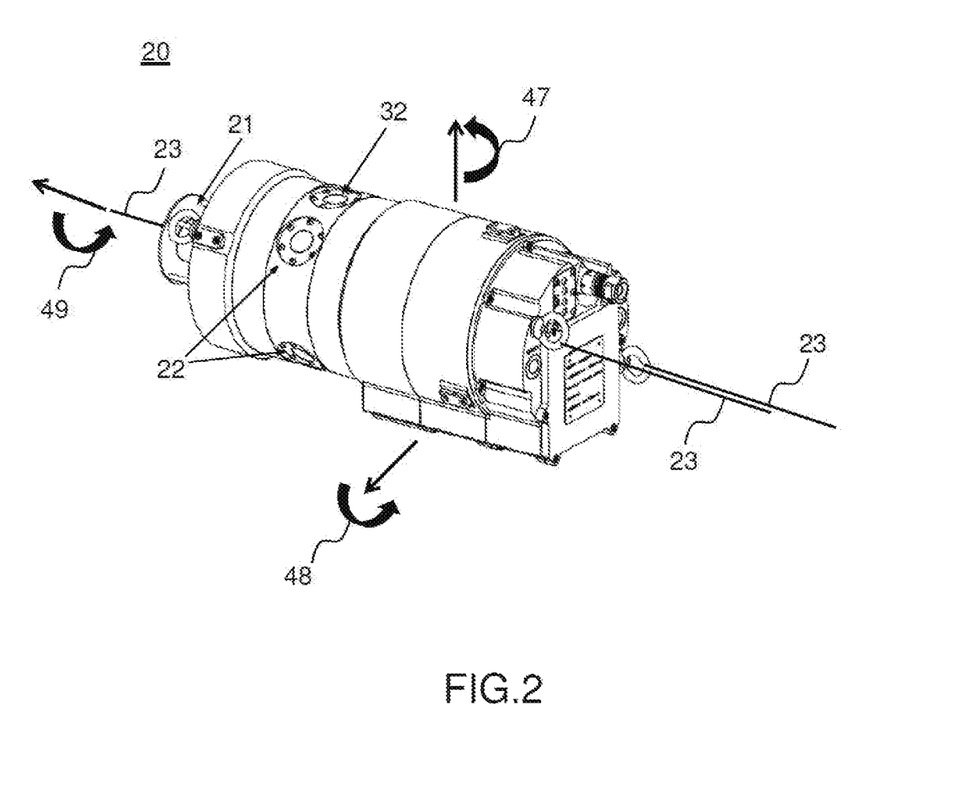

FIG. 2 schematically represents an isometric view of another embodiment of a non-motorized inspection device 20 for inspecting a fluid pipeline according to the invention. The inspection device 20 represented in FIG. 2 comprises the same elements as the inspection device 10 represented in FIG. 1. In FIG. 2, it can be seen that the inspection device 20 can comprise a line 23, preferentially made of stainless steel, to link the inspection device to the outside of the pipeline. In this case, the inspection device 20 can comprise one or more hooks fixed to the housing of the inspection device 20, and to which the line 23 is linked in order to be able, if necessary, to pull the inspection device 20 in one direction or another of the pipeline, for example to remove it from the pipeline 11 once the inspection mission is finished. The line 23 can also make it possible to determine the distance traveled by the inspection device 20, as explained in the description of FIG. 3.

Moreover, the inspection device 20 can comprise a pipeline lighting means 32. This can be a light-emitting diode or a strip of light-emitting diodes. The lighting means 32 is a light emitter ensuring better quality representations in the dark pipeline. The inspection device 20 can also comprise a locating means 33. The locating means 33 is a light reflector making it possible to locate the inspection device 20. It can for example be a diving light and/or the housing of the inspection device can be white or of light color in order to better locate it in the waste waters of the pipeline.

Figure 3:
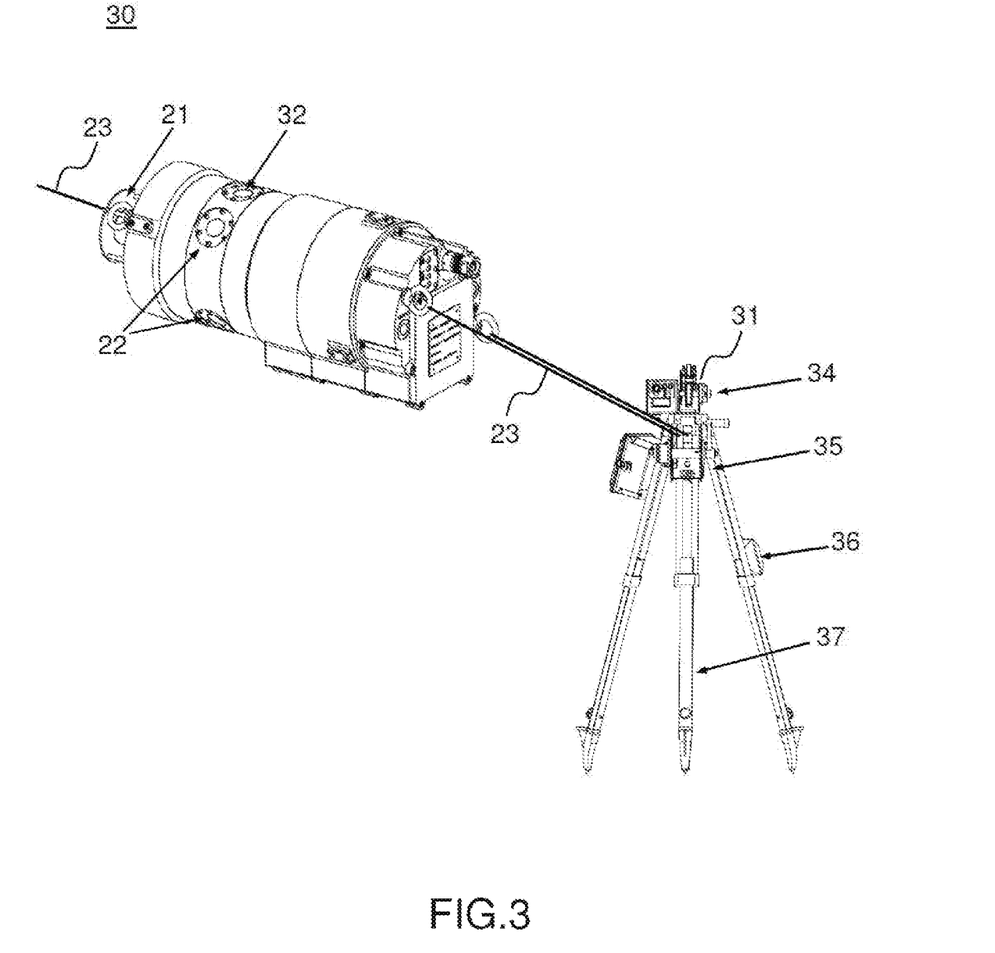

FIG. 3 schematically represents an isometric view of another embodiment of a non-motorized inspection device 30 for inspecting a fluid pipeline according to the invention. The inspection device 30 represented in FIG. 3 comprises the same elements as the inspection device 20 represented in FIG. 2. In FIG. 3, the inspection device 30 further comprises an odometer 31 capable of determining the distance traveled by the inspection device 30. The distance traveled by the inspection device 30 makes it possible to determine where the inspection device 30 is located in the pipeline 11. By virtue of the odometer, it is possible to associate each representation 13 with a well-defined place in the pipeline 11.

The inspection device 30 can comprise a braking device 35 for the inspection device 30 capable of immobilizing the inspection device 30 at at least one predefined distance interval for a time at least equal to the time of generation of the at least one representation 13. The braking device 35 can be a device embedded on the inspection device, or, as in the embodiment represented in FIG. 3, a device situated outside the pipeline, for example on a tripod or any other support. The braking device 35 makes it possible to keep the inspection device 30 immobile at desired points for the time it takes to generate a complete representation 13.

According to the invention, the braking device 35 can be an automatic braking device with recording of the distance traveled by the inspection device 30. The braking device 35 can be configured so as to block the winder of the line 23, automatically at regular intervals, for example every 30 cm, so that the inspection device 30 is immobile and has the time to generate a representation 13, for example to do a complete 360 degree sonar acquisition at the same position in the case of a rotary sonar.

The distance corresponding to this position and measured by the odometer 31 is recorded at each of the automatic stops of the inspection device 30.

It should be noted that the invention applies likewise with a continuous recording of the distance to dispense with the automatic stops of the inspection device 30. In this case, the representation 13 is degraded: for example, the sonar acquisitions would be incomplete since there would not be a 360 degree sonar image at a given position, but this operation remains possible.

The odometer 31 is associated with a recording system in order to be able to link the representations 13 (for example sonar data) and the data from the inertial unit 14 with the distance data from the odometer 31.

In the inspection device, the representations 13 and the data from the inertial unit 14 are not assembled together. In one embodiment, a computer embedded in the inspection device generates a time-stamped file for each sensor (that is to say a time-stamped file for the sonar, a time-stamped file for the inertial unit, a time-stamped file for each camera) and it records them. The odometer 31 generates a time-stamped distance file. Subsequently, using analysis software, all these data are displayed coherently (synchronized using the time-stamping of the files). In an exemplary embodiment, the inspection device can be equipped with an internal clock system. The data from the inertial unit 14 and the representations 13 are each recorded as a function of the time stamping then read synchronously.

Figure 4:
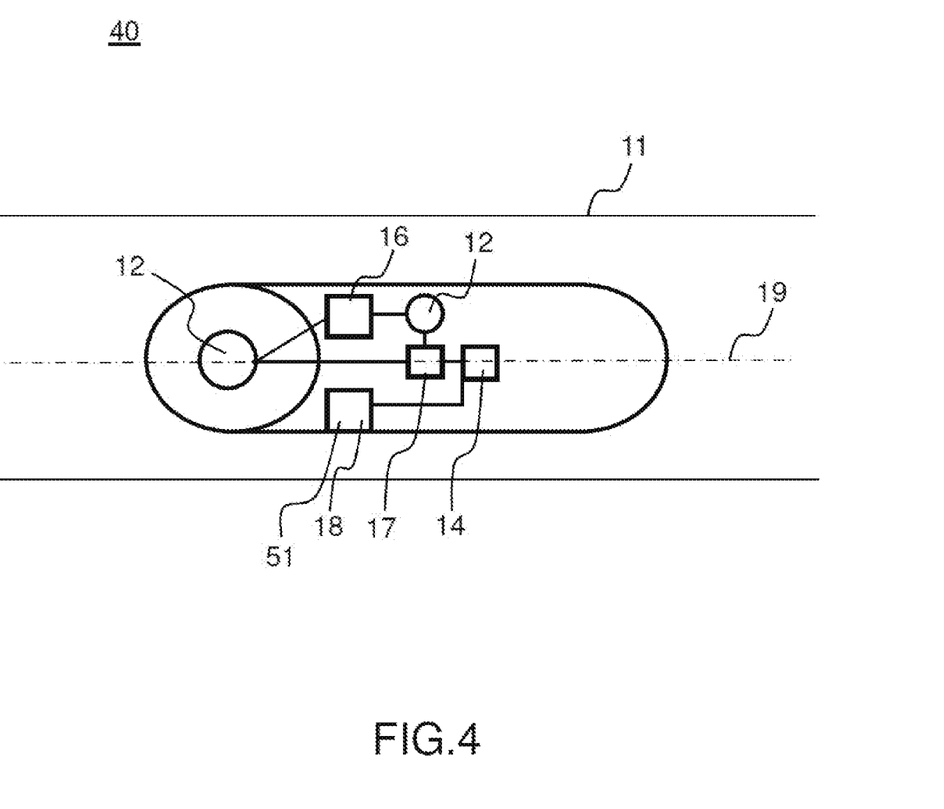

FIG. 4 schematically represents another embodiment of a non-motorized inspection device 40 for inspecting a fluid pipeline according to the invention. The inspection device 40 represented in FIG. 4 comprises the same elements as the inspection device 30 represented in FIG. 3. In FIG. 4, the means 18 for preventing distortion of the at least one representation 13 comprises a comparator 51 comparing the data from the inertial unit 14 with predefined data of the pipeline 11 so as to process the at least one representation 13. The comparator 51 can be embedded on the inspection device 40 (as represented here), but it can also be not embedded, and located on a support outside of the pipeline 11.

The principle of the inertial unit 14 is as follows. The inertial unit 14 measures the orientation. It does not measure a position with GPS coordinates. This orientation is expressed in the form of three Euler angles (each expressed in degrees): pitch 48, yaw 47 and roll 49 (see reference in FIG. 2). The reference for the inertial unit is magnetic north (the three angles are then equal to 0).

In order to exploit the data from an inertial unit for the inspection of a pipeline or of a trap, it is necessary to identify false distortions to exploit the sonar data. When the pipeline is in good condition and it does not exhibit any deposition (neither fouling nor grease), if the inspection device is parallel to the axis of the pipeline, the sonar image acquired is normally circular. When the sonar image acquired during the inspection is of oval form, there are two possibilities: the pipeline is distorted ovally or the inspection device is not parallel to the axis of the pipeline. It is therefore essential to be able to determine whether the inspection device is parallel to the axis of the pipeline or not in order to invalidate (or to correct) all the acquisitions in which the inspection device is not parallel to the pipeline.

For that, it is necessary to compare the yaw and pitch angles measured by the inspection system with the pitch and yaw angles of the pipeline (they can be calculated theoretically from plans of the work or measured on site if the configuration of the site permits it). In the case of a trap, the angles will be different on each of the three portions of the work. For each sonar acquisition, the yaw and pitch angles of the inspection device have to be compared with those expected for this portion of the pipeline. If the deviation is too great (with respect to a threshold value predetermined by tests), then the sonar image is to be invalidated or to be corrected.

Likewise, it is essential to determine the orientation of the defects to exploit the sonar data. The roll angle makes it possible to know the orientation of the inspection device, and therefore of the defects (fouling, roots, etc.), with respect to the apron and to the roof of the pipeline.

The comparator 51 can compare the data acquired by the inertial unit 14 and orientation data of the pipeline 11 (data which can be theoretical, obtained from drawings or input by a user according to a prior initialization in the field) to determine whether the inspection device 40 is parallel to the axis of the pipeline 11. If the inspection device 40 is not parallel to the axis of the pipeline, the representation 13 generated is distorted. Using the comparator 51, it is possible to know whether the representation 13 generated is distorted. If such is the case, the user can reprocess the representation 13 based on the data acquired by the inertial unit 14 to perform a post-processing of the representation 13.

Figure 5:
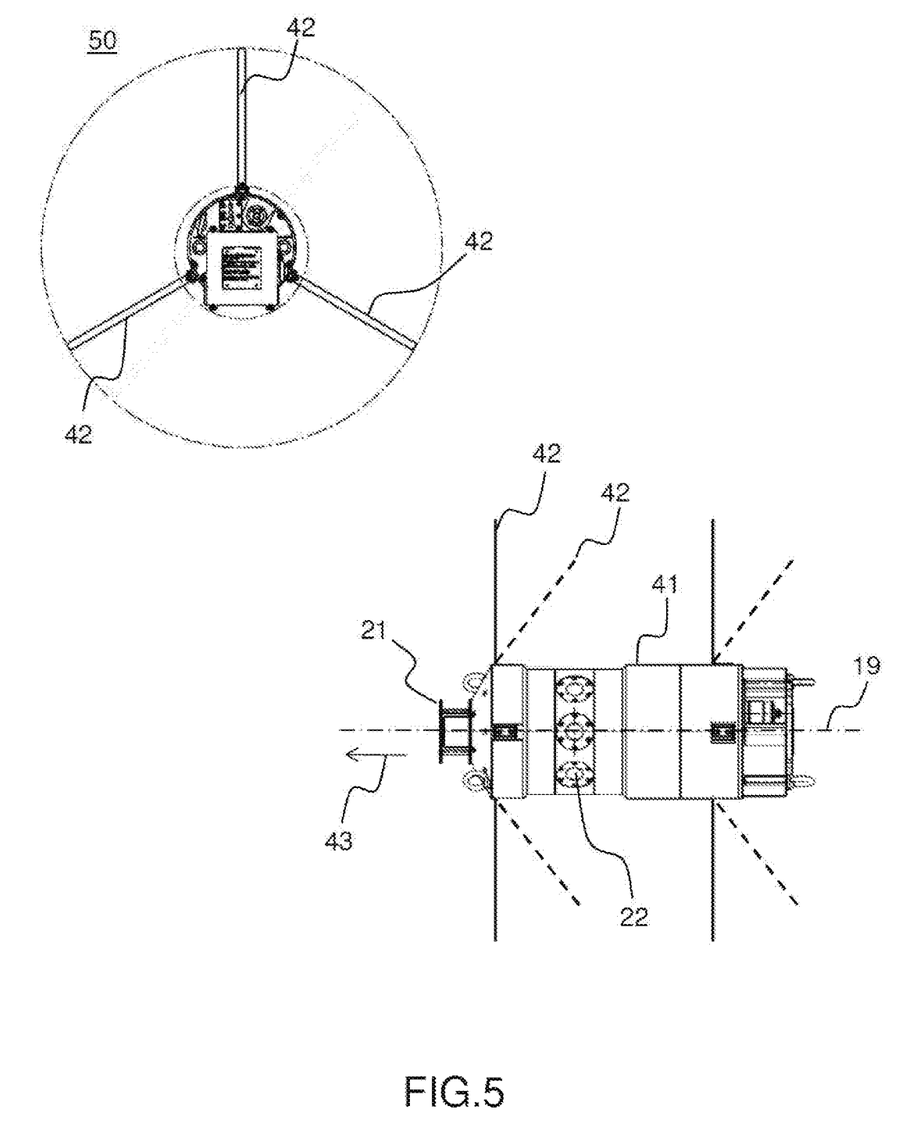
FIG. 5 represents a view from behind and a view from above of another embodiment of a non-motorized inspection device for inspecting a fluid pipeline according to the invention.

FIG. 5 represents a view from behind (on the right side of the figure) and a view from above (on the top side of the figure) of another embodiment of a non-motorized inspection device 50 for inspecting a fluid pipeline according to the invention. The inspection device 50 represented in FIG. 5 comprises the same elements as the inspection device 30 represented in FIG. 3. In FIG. 5, if itis considered that the inspection device 50 is intended to extend locally along a first axis 19 that is substantially at right angles to a section of the pipeline 11 and comprising a housing 41 encapsulating the inertial unit 14 and supporting the monitoring device 12, the distortion-prevention means 18 comprises at least two sets of at least three guide strips 42 distributed around the housing 41, each of the at least three guide strips 42 extending radially with respect to the first axis 19 from the housing 41. These sets of guide strips 42 make it possible to stabilize the inspection device 50 in the pipeline 11. Depending on the length and the positioning of the guide strips 42 around the housing 41, the inspection device 50 is stabilized at a certain distance from the edges of the pipeline and, advantageously, centered in the pipeline. That makes it possible to obtain a distortion-free representation.

The at least three guide strips 42 of each of the at least two sets are preferably uniformly distributed around the housing 41 to allow a better stability of the inspection device 50, and preferentially positioned at the same level, as in FIG. 5. As represented, at least one set of guide strips 42 is positioned at the front of the inspection device, and at least one set of guide strips 42 is positioned at the rear of the inspection device (front and rear being defined in relation to the first axis 19). Thus, the inspection device 50 is kept stable, at a predefined distance from the edges of the pipeline and parallel to the axis 19 of the pipeline 11.

The at least three guide strips 42 of each of the at least two sets are flexible and each of the guide strips is configured to form a spot bearing on the inner wall of the pipeline. The guide strips 42 are sufficiently rigid to hold the inspection device 50 in its position in the pipeline 11 and sufficiently flexible to bend on contact with an obstacle in the pipeline, as represented by dotted lines on the right side of FIG. 5 (the arrow referenced 43 indicates the direction of movement of the inspection device 50 in the pipeline 11). The flexibility of the guide strips 42 makes it possible both to keep the inspection device 50 at a certain distance from the edges of the pipeline 11, advantageously at the center of the pipeline 11, and to not block the inspection device 50 in its movement in the pipeline 11 in case of partial obstruction of the pipeline 11. The spot bearing of the guide strips against the inner wall of the pipeline allows for a better agility in the pipeline in the presence of pipeline bends.

This distortion-prevention means 18 ensures the mobility of the inspection device in the pipeline despite the obstacles present in the waste waters. Furthermore, by virtue of the good positioning of the inspection device in the pipeline, the representation 13 generated is not distorted since the measuring based on the sonar data is stable, parallel to the axis of the pipeline and well centered. It is thus possible to obtain representations 13 such as good quality sonar images without performing adjustments of the sonar during the inspection of the pipeline.

It should be noted that it is preferable to make an adjustment at the start of the inspection. At the start of inspection, the inspection device is linked to a field computer on the surface, using a cable (watertight ethernet cable with watertight plugs), and the sounding machine is lowered into the pipeline. It is then possible to view the sonar images on the field computer, and to adjust the sonar (in particular the two gain and range parameters) until a sharp, echo-free sonar image is obtained. Once this adjustment has been made, the ethernet cable is removed, the plug is shuttered (for example by a stopper) and only then can the inspection begin, with no subsequent adjustment during the inspection.

An inspection without an adjustment at the start of inspection is however possible. Nevertheless, there would be risk of having less easily usable sonar images. If the diameter of the pipeline varies greatly (for example in a pipeline of a certain diameter which gives onto a storage chamber of a significantly greater size), the sonar images are sharp and echo-free on the part of the work for which the sonar has been set.

It can be noted that if the pipeline 11 is not completely immersed but the water level is high, it is nevertheless possible to use the inspection device according to the invention. Only the inspection of the submerged part of the pipeline 11 will take place in this case, which means that there will be no data concerning the roof of the pipeline 11.

The invention claimed is:

1. An inspection device with non-motorized displacement for inspecting a fluid pipeline, wherein the inspection device comprises:

a monitoring device capable of generating at least one representation of the pipeline, an inertial unit capable of determining orientation data relating to the inspection device, a means for preventing distortion of the at least one representation, the inspection device being intended to extend locally along a first axis that is substantially at right angles to a section of the pipeline and comprising a housing encapsulating the inertial unit and supporting the monitoring device, wherein the means for preventing distortion of the at least one representation comprises at least two sets of at least three flexible guide strips distributed around the housing, each of the at least three flexible guide strips extending radially with respect to the first axis from the housing and each of the guide strips being configured to form a spot bearing on the pipeline.

2. The inspection device as claimed in claim 1, wherein the monitoring device is a sonar and/or a camera.

3. The inspection device as claimed in claim 1 comprising a first storage means capable of storing the at least one representation and the data from the inertial unit.

4. The inspection device as claimed in claim 1, comprising an odometer capable of determining the distance traveled by the inspection device.

5. The inspection device as claimed in claim 1, comprising a braking device for the inspection device capable of immobilizing the inspection device at at least one predefined distance interval for a time at least equal to the time of generation of the at least one representation.

6. The inspection device as claimed in claim 1, comprising a pipeline lighting means.

7. The inspection device as claimed in claim 1, comprising a locating means.

8. The inspection device as claimed in claim 1, wherein the at least three guide strips of each of the at least two sets are uniformly distributed around the housing.

9. The inspection device as claimed in claim 1, further comprising a comparator comparing the data from the inertial unit with predefined data relating to the pipeline so as to process the at least one representation.

* * * * *